United States Patent
Huizenga et al.

(10) Patent No.: US 12,241,027 B2
(45) Date of Patent: Mar. 4, 2025

(54) METHOD OF SUBJECTING A BIOMASS FEEDSTOCK TO HYDROPYROLYSIS

(71) Applicant: SHELL USA, INC., Houston, TX (US)

(72) Inventors: Pieter Huizenga, Amsterdam (NL); Julien Sigaud, Amsterdam (NL)

(73) Assignee: SHELL USA, INC., Houston, TX (US)

(*) Notice: Subject to any disclaimer, the term of this patent is extended or adjusted under 35 U.S.C. 154(b) by 0 days.

(21) Appl. No.: 17/854,285

(22) Filed: Jun. 30, 2022

(65) Prior Publication Data

US 2023/0017405 A1 Jan. 19, 2023

(51) Int. Cl.
*C10G 3/00* (2006.01)
*B01J 8/18* (2006.01)
(Continued)

(52) U.S. Cl.
CPC .............. *C10G 3/57* (2013.01); *B01J 8/1836* (2013.01); *B01J 8/1845* (2013.01); *B01J 8/1872* (2013.01); *C10G 1/06* (2013.01); *C10G 1/08* (2013.01); *C10G 3/50* (2013.01); *B01J 2208/00132* (2013.01); *C10G 2300/1011* (2013.01);
(Continued)

(58) Field of Classification Search
None
See application file for complete search history.

(56) References Cited

U.S. PATENT DOCUMENTS 2,852,545 A    9/1958   Frank
4,176,710 A * 12/1979   Gansauge ............. C01B 33/107
                                                             165/142
(Continued)

OTHER PUBLICATIONS

International Search Report and Written Opinion received for PCT Patent Application No. PCT/US2021/064050, mailed on Feb. 8, 2022, 10 pages.

(Continued)

*Primary Examiner* — In Suk C Bullock
*Assistant Examiner* — Alyssa L Cepluch
(74) *Attorney, Agent, or Firm* — Shell USA, Inc.

(57) ABSTRACT

The present invention relates to a method of subjecting a biomass feedstock to hydropyrolysis, the method at least comprising the steps of:
   a) supplying a biomass feedstock and a fluidizing gas comprising hydrogen to a bulk reactor zone of a fluidized bed reactor containing a deoxygenating catalyst;
   b) subjecting the biomass feedstock in the bulk reactor zone of the fluidized bed reactor to a hydropyrolysis reaction by contacting the biomass feedstock with the deoxygenating catalyst in the presence of the fluidizing gas, thereby obtaining a hydropyrolysis reactor output comprising at least one non-condensable gas, a partially deoxygenated hydropyrolysis product and char;
wherein the bulk reactor zone is cooled by means of a cooling fluid flowing through a plurality of tubes running through the bulk reactor zone, the plurality of tubes having inlets into and outlets from the bulk reactor zone; and
wherein the cooling fluid flowing in the tubes at the point ('A') where the biomass feedstock enters the bulk reactor zone has a temperature of at least 320° C., preferably at least 340° C., more preferably at least 350° C., even more preferably at least 370° C., yet even more preferably at least 380° C.

13 Claims, 1 Drawing Sheet

(51) Int. Cl.
  *C10G 1/06* (2006.01)
  *C10G 1/08* (2006.01)
(52) U.S. Cl.
  CPC ............... *C10G 2300/4006* (2013.01); *C10G 2300/4012* (2013.01); *C10G 2300/4043* (2013.01)

(56) References Cited

U.S. PATENT DOCUMENTS

| | | |
|---|---|---|
| 5,053,570 A | 10/1991 | Soto et al. |
| 8,492,600 B2 | 7/2013 | Marker et al. |
| 8,841,495 B2 | 9/2014 | Marker et al. |
| 10,822,546 B2 | 11/2020 | Urade et al. |
| 2005/0002837 A1* | 1/2005 | Trott .......................... B01J 8/44 422/233 |
| 2010/0256428 A1 | 10/2010 | Marker et al. |
| 2016/0002540 A1 | 1/2016 | Felix et al. |
| 2016/0068758 A1* | 3/2016 | Linck ..................... C10G 47/02 423/655 |
| 2017/0130134 A1 | 5/2017 | Urade et al. |
| 2018/0346823 A1 | 12/2018 | Urade et al. |

OTHER PUBLICATIONS

International Search Report and Written Opinion received for PCT Patent Application No. PCT/US2022/036898, mailed on Sep. 29, 2022, 10 pages.

* cited by examiner

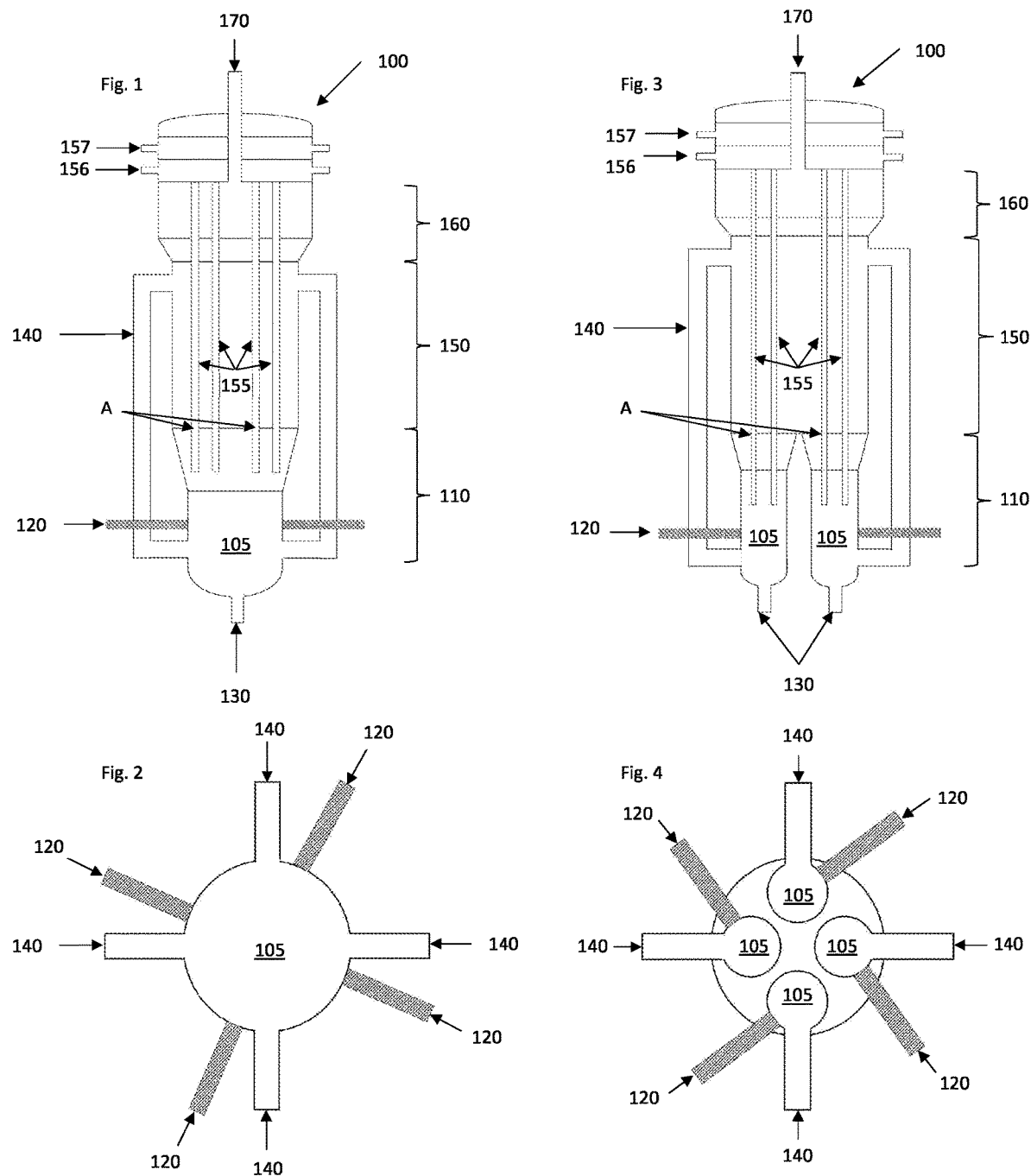

METHOD OF SUBJECTING A BIOMASS FEEDSTOCK TO HYDROPYROLYSIS

This application benefits from the priority of European Patent Application No. 21185790.9, entitled "A METHOD OF SUBJECTING A BIOMASS FEEDSTOCK TO HYDROPYROLYSIS," filed Jul. 15, 2021, which is hereby incorporated by reference in its entirety.

The present invention generally relates to hydropyrolysis processes and fluidized bed reactors for converting a biomass feedstock into a liquid hydrocarbon material suitable for use as a fuel or as a blending component in a fuel.

With increasing demand for liquid transportation fuels, decreasing reserves of 'easy oil' (crude petroleum oil that can be accessed and recovered easily) and increasing constraints on the carbon footprints of such fuels, it is becoming increasingly important to develop routes to produce liquid transportation fuels from alternative sources in an efficient manner.

Biomass offers a source of renewable carbon and refers to biological material derived from living or deceased organisms and includes lignocellulosic materials (e.g. wood), aquatic materials (e.g. algae, aquatic plants, and seaweed) and animal by-products and wastes (e.g. offal, fats, and sewage sludge). Liquid transportation fuels produced from biomass are sometimes referred to as 'biofuels'. Therefore, when using such biofuels, it may be possible to achieve more sustainable $CO_2$ emissions compared with petroleum-derived fuels.

However, in the conventional pyrolysis of biomass, typically fast pyrolysis carried out in an inert atmosphere, a dense, acidic, reactive, liquid bio-oil product is obtained. This product contains water, oils and char formed during the process. The use of bio-oils produced via conventional pyrolysis is, therefore, subject to several drawbacks. These include increased chemical reactivity, water miscibility, high oxygen content and low heating value of the product. Often these products can be difficult to upgrade to fungible liquid hydrocarbon fuels.

More recently, the use of hydrogen in biomass pyrolysis (i.e. hydropyrolysis) has been disclosed. For example, hydropyrolysis processes such as those described in U.S. Pat. No. 8,492,600 have been found to overcome a number of the drawbacks of conventional fast pyrolysis processes, including those described above.

Hydropyrolysis of a biomass feedstock may be carried out in a reactor vessel containing a fluidized bed. Fluidized beds generally include solid particles, such as catalyst, which are agitated and fluidized by a stream of gas, which travels upward through the bed and exits from the bed at or near the top of the reactor.

However, it has now been recognized that conventional fluidized bed reactors may suffer from a variety of drawbacks when used for the hydropyrolysis of a biomass feedstock on a commercial scale. For example, when operating on a commercial scale, temperature control within the reactor is a primary concern due to the minimum temperature required at the reactor inlet versus the maximum temperature allowable at the reactor outlet. That is to say, the reactor inlet temperature generally needs to be maintained above a certain minimum temperature to prevent operability issues within the reactor (e.g. formation of sticky materials) and to obtain a suitable commercial yield of the desired resulting product, while the reactor outlet temperature needs to be maintained below a certain maximum temperature for catalyst stability and suitable yield of the desired resulting product. However, when operating a conventional fluidized bed reactor such that the minimum reactor inlet temperature is satisfied, the heat generated by the exothermic hydrodeoxygenation reaction occurring inside the reactor generally causes the reactor outlet temperature to far exceed the maximum allowable temperature unless excessive use of quench gas or ballast gas is applied, both of which are economically undesirable.

It is an object of the present invention to minimize one or more of the above or other problems.

It is a further object of the present invention to provide a method of subjecting a biomass feedstock to hydropyrolysis, wherein the deposition of sticky materials such as tar in the fluidized bed reactor is minimized or even avoided.

One or more of the above or other objects can be achieved by a method of subjecting a biomass feedstock to hydropyrolysis, the method at least comprising the steps of:
a) supplying a biomass feedstock and a fluidizing gas comprising hydrogen to a bulk reactor zone of a fluidized bed reactor containing a deoxygenating catalyst;
b) subjecting the biomass feedstock in the bulk reactor zone of the fluidized bed reactor to a hydropyrolysis reaction by contacting the biomass feedstock with the deoxygenating catalyst in the presence of the fluidizing gas, thereby obtaining a hydropyrolysis reactor output comprising at least one non-condensable gas, a partially deoxygenated hydropyrolysis product and char;
wherein the bulk reactor zone is (indirectly) cooled by means of a cooling fluid flowing through a plurality of tubes running through the bulk reactor zone, the plurality of tubes having inlets into and outlets from the bulk reactor zone; and
wherein the cooling fluid flowing in the tubes at the point where the biomass feedstock enters the bulk reactor zone has a temperature of at least 320° C., preferably at least 340° C., more preferably at least 350° C., even more preferably at least 370° C., yet even more preferably at least 380° C.

It has surprisingly been found according to the present invention that by utilizing the hydropyrolysis methods and fluidized bed reactors disclosed herein, the deposition of sticky materials such as tar in the fluidized bed reactor can be minimized or even avoided.

Furthermore, the plurality of tubes running through the bulk reactor zone may help to—in addition to cooling the bulk reactor zone—avoid the formation of big bubbles in the fluidized bed. Also, the plurality of tubes may help to promote the catalyst axial mixing and therefore the heat transfer from top to bottom of the bulk reactor zone.

Another advantage of the present invention is that it is possible to maintain both a suitable minimum temperature at a reactor inlet, while simultaneously not exceeding a maximum temperature at a reactor outlet. Additionally, the methods and reactors disclosed herein provide the advantage that a biomass feedstock supplied to a reactor inlet is both rapidly heated and dispersed along with the catalyst present in the fluidized bed reactor.

Also, the temperature of the fluidized bed can be kept under control without any injection of quenching fluid, thereby avoiding risks of cold spots in the fluidized bed and subsequent formation of tars or product yields reduction. As the temperature of the fluidized bed is kept under control, risks of runaway reactions and subsequent safety-related issues are avoided. Further, production of non-condensables is minimized while the production of liquid fuels is maximized.

In step a) of the method according to the present invention a biomass feedstock and a fluidizing gas comprising hydrogen are supplied to a bulk reactor zone of a fluidized bed reactor containing a deoxygenating catalyst. Typically, the bulk reactor zone is preceded by a mixing zone (as further discussed below) wherein mixing of biomass feedstock, deoxygenating catalyst and fluidizing gas takes place.

Biomass Feedstock

The person skilled in the art will readily understand that the biomass feedstock is not particularly limited and may contain any combination of biomass-containing and/or biomass-derived feedstock.

As used herein, the term 'biomass' generally refers to substances derived from organisms living above the earth's surface or within the earth's oceans, rivers, and/or lakes. Representative biomass can include any plant material, or mixture of plant materials, such as a hardwood (e.g., whitewood), a softwood, a hardwood or softwood bark, pine wood, lignin, algae, and/or lemna (sea weeds). Energy crops, or otherwise agricultural residues (e.g. logging residues) or other types of plant wastes or plant-derived wastes, may also be used as plant materials. Specific exemplary plant materials include corn fiber, corn stover, and sugar cane bagasse, in addition to 'on-purpose' energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include vegetable oils, carbohydrates (e.g., sugars), organic waste materials, such as waste paper, construction, demolition wastes, and biosludge.

A 'biomass-containing' feedstock may comprise all or substantially all biomass, but may also contain non-biological materials (e.g. materials derived from petroleum, such as plastics, or materials derived from minerals extracted from the earth, such as metals and metal oxides, including glass) in significant quantities (e.g., at least about 5% by weight, such as from about 5% to about 55% by weight, or at least about 25% by weight, such as from about 25% to about 45% by weight). An example of a 'biomass-containing' feedstock that may comprise one or more non-biological materials is municipal solid waste (MSW).

'Biomass-derived', for example when used in the phrase 'biomass-derived feedstock', refers to products resulting or obtained from the thermal and/or chemical transformation of biomass, as defined above, or biomass-containing feedstocks (e.g., MSW). Representative biomass-derived feedstocks therefore include, but are not limited to, products of pyrolysis (e.g. bio-oils), torrefaction (e.g. torrefied and optionally densified wood), hydrothermal carbonization (e.g. biomass that is pretreated and densified by acid hydrolysis in hot, compressed water), and polymerization (e.g., organic polymers derived from plant monomers). Other specific examples of biomass-derived products (e.g., for use as feedstocks) include black liquor, pure lignin, and lignin sulfonate. Biomass-derived feedstocks also extend to pretreated feedstocks that result or are obtained from thermal and/or chemical transformation, prior to, or upstream of, their use as feedstocks for a given conversion step (e.g. hydropyrolysis). Other examples of suitable biomass feedstocks include those described in U.S. Pat. No. 10,822,546, the relevant disclosure of which is hereby incorporated by reference.

The biomass feedstock may be used in a dry form, for example, after being subjected to a drying step sufficient to reduce the moisture content of the initial feedstock to less than about 1% by weight, or even less than about 0.1% by weight). According to other embodiments, the biomass feedstock may include moisture (e.g., have a moisture content of greater than about 1%, such as from about 1% to about 20% by weight, preferably below 12% by weight). In still other embodiments, the biomass feedstock may be used in the form of an aqueous slurry.

The rate at which the biomass feedstock is fed into the fluidized bed reactor depends upon, inter alia, the temperature, the amount of catalyst and partial pressure of hydrogen within the reactor.

The weight hourly space velocity (WHSV) in the fluidized bed reactor, calculated as the combined weight flow rate of the biomass feedstock, divided by the weight of the catalyst inventory in the reactor, is generally from $0.1\ hr^{-1}$ to $10\ hr^{-1}$, typically from $0.5\ hr^{-1}$ to $5\ hr^{-1}$, and often from $0.8\ hr^{-1}$ to $3\ hr^{-1}$. In general, the fluidization velocity, catalyst size and bulk density and feedstock size and bulk density are chosen such that the deoxygenation catalyst remains in the fluidized bed, while the char produced gets entrained out of the reactor.

The exact catalyst WHSV that is appropriate for a given combination of feedstock and catalyst depends on the nature of the feedstock and catalyst, and on the desired composition of the products that are to be obtained. The atmosphere in the reactor should consist largely of hydrogen (though other inert gases, like $CO_2$, may also be present), and the feedstock flow rate cannot be so great that the vapor-phase products of feedstock decomposition dilute the hydrogen atmosphere to a point where the required partial pressure of hydrogen needed to carry out the desired set of reactions is no longer available.

Deoxygenating Catalyst

The person skilled in the art will readily understand that the deoxygenation catalyst as used in the present invention is not particularly limited.

Deoxygenation catalysts suitable for use herein generally comprise one or more active metals selected from cobalt, molybdenum, nickel, tungsten, ruthenium, platinum, palladium, iridium and iron. Preferably, the one or more active metals are selected from cobalt, molybdenum, nickel and tungsten.

The metals present in the deoxygenation catalyst are typically supported, preferably on a metal oxide support. Metal oxides useful as supports for the deoxygenation catalyst include alumina, silica, titania, ceria, zirconia, magnesia, as well as binary oxides such as silica-alumina, silica-titania and ceria-zirconia. Preferred supports include alumina, silica and titania. The support may optionally contain recycled, regenerated and revitalised fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the deoxygenation catalyst are preferably in the range of from 0.05 wt. % to 3 wt. % for noble metals (e.g. ruthenium, platinum, palladium and iridium) and from 1 wt. % to 75 wt. % for base metals (e.g. cobalt, molybdenum, nickel, tungsten and iron) (weight percentages are expressed as a weight percentage of total of all active metals on the calcined catalyst in their reduced (metallic) form).

Additional elements such as one or more of phosphorous, boron and nickel may be incorporated into the catalyst to improve the dispersion of the active metal.

The deoxygenation catalyst may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The deoxygenation catalyst is not limited to a specific shape and may for example be present in the form of spherical catalyst particles. Catalyst particles sizes, for use in a commercial reactor in the hydropyrolysis step, are preferably in the range of from 0.3 mm to 4.0 mm, more preferably in the range of from 0.4 mm to 2.0 mm, and most preferably in the range of from 0.5 mm to 1.6 mm.

Fluidized Bed Reactor

The fluidized bed reactor as used according to the present invention is not particularly limited. As the person skilled in the art is familiar with fluidized bed reactors and the use thereof, this reactor is not discussed here in detail.

A fluidized bed reactor of the present invention generally comprises a mixing zone, a bulk reactor zone and optionally, an expanded solids disengagement zone (i.e., a section of expanded reactor diameter or cross-sectional area, relative to the diameter or cross-sectional area of the bulk reactor zone) at a suitable height above the bulk reactor zone in order to promote the separation of solid char particles from solid catalyst particles. The fluidized bed reactor may comprise one or more downcomers fluidly connecting the bulk reactor zone located at or near the top of the reactor to the mixing zone located at or near the bottom part of the reactor.

As used herein, the term 'mixing zone' is used to describe a region located at or near the bottom of a fluidized bed reactor wherein mixing of a biomass feedstock, a deoxygenating catalyst and a fluidizing gas comprising hydrogen takes place. In accordance with the present disclosure, a biomass feedstock and a fluidizing gas are supplied to the mixing zone of the fluidized bed reactor via one or more inlets, preferably located at or near the bottom of the reactor.

Additionally, a catalyst recirculation stream comprising a deoxygenating catalyst may be supplied to the mixing zone via one or more downcomers, which are in fluid communication with a bulk reactor zone located at or near the top of the fluidized reactor bed such that the catalyst recirculation stream is withdrawn from the bulk reactor zone and supplied to the mixing zone via the one or more downcomers. Preferably, the biomass feedstock is supplied to the mixing zone at a point that is above the inlet for the catalyst recirculation stream (if present), so that the biomass feedstock is rapidly heated from ambient temperature to the target temperature required for hydropyrolysis to occur. In addition, the catalyst recirculation stream is preferably allowed to thermally equilibrate with the fluidizing gas before coming into contact with the biomass feedstock to enable the fastest possible heat transfer.

The mixing zone generally comprises one or more cylindrical vessels, for example from one to five. The biomass feedstock, the fluidized gas and the catalyst recirculation stream may each be introduced to the one or more cylindrical vessels in the mixing zone via one or more (for example from one to ten) inlet locations, which may correspond to different axial heights within the mixing zone. In one embodiment, the biomass feedstock may be supplied to the mixing zone via more than one inlet location at different axial heights. Preferably, in the mixing zone, an inlet for the biomass feedstock is located above an inlet for the catalyst recirculation stream and an inlet for the fluidizing gas. The mixing zone is generally from about 4% to about 30% of the total reactor volume, preferably from about 10% to about 20% of the total reactor volume. While the exact dimensions of the mixing zone may vary, the mixing zone typically may have an internal diameter of from 0.1 to 3 meter, preferably above 0.15 meter and preferably below 2 meter, more preferably below 1 meter, even more preferably below 0.6 meter. It is within the ability of one skilled in the art to determine a suitable dimension for the mixing zone, taking into consideration, for example, the number of cylindrical vessels utilized, along with other operating conditions, such as the superficial gas velocity of the fluidizing gas, the rate at which the biomass feedstock is fed into the mixing zone, the amount of catalyst and partial pressure of hydrogen within the reactor, the desired residence time in the mixing zone of the catalyst, biomass, and fluidizing gas, etc. It is also within the ability of one skilled in the art to determine a suitable dimension for the mixing zone such that back-mixing of biomass from a bulk reactor zone located above the mixing zone is negligible, taking into consideration, for example, the superficial gas velocity of the fluidizing gas.

Optionally, the mixing zone may further comprise one or more mixing devices. Suitably, any device that promotes axial and/or radial mixing within the mixing zone may be employed in the fluidized bed reactors of the present disclosure. One example of such a suitable mixing device includes a deflection ring positioned at the wall of the mixing zone.

In addition to the mixing zone, a fluidized bed reactor of the present disclosure further comprises a bulk reactor zone. As used herein, the term 'bulk reactor zone' is used to describe a region in a fluidized bed reactor positioned downstream (i.e. above) the mixing zone wherein hydropyrolysis of the biomass primarily occurs. The biomass is supplied to the bulk reactor zone from the mixing zone. In the bulk reactor zone, the biomass is contacted with the deoxygenating catalyst in the presence of the fluidizing gas under the desired hydropyrolysis conditions to produce a hydropyrolysis reactor output comprising at least one non-condensable gas, a partially deoxygenated hydropyrolysis product and char. Subsequently, in a preferred embodiment of the present invention, at least a portion of the deoxygenating catalyst from the bulk reactor zone of the hydropyrolysis reactor is withdrawn via one or more downcomers to form the catalyst recirculation stream that is supplied to the mixing zone.

The bulk reactor zone is generally from about 70% to about 96% of the total reactor volume, preferably from about 80% to about 90% of the total reactor volume. It is within the ability of one skilled in the art to determine a suitable dimension for the bulk reactor zone, taking into consideration, for example, the dimensions of the mixing zone, along with other operating conditions, such as the superficial gas velocity of the fluidizing gas, the partial pressure of hydrogen within the reactor, the operating temperature, and the desired residence time of the biomass, and fluidizing gas, etc. It is also within the ability of one skilled in the art to determine a suitable dimension for the bulk reactor zone such that back-mixing of biomass from the bulk reactor zone to the mixing zone is negligible, taking into consideration, for example, operating conditions such as the superficial gas velocity of the fluidizing gas.

According to the present invention, the fluidized bed reactor comprises a plurality of tubes running through the bulk reactor zone, the plurality of tubes having inlets into and outlets from the bulk reactor zone, wherein the reactor zone can be (indirectly) cooled by means of a cooling fluid flowing through the tubes. The cooling fluid flowing through the plurality of tubes cools the bulk reactor zone in an indirect manner, i.e. the cooling fluid itself remains in the tubes and does not directly contact the content of the bulk reactor zone.

Optionally, the bulk reactor zone may further comprise one or more internals for heat exchange and/or one or more bubble breakers to prevent slug formation. Additionally, the bulk reactor zone may optionally further comprise one or more gas and/or liquid (water, hydrocarbon) quenches that serve to reduce the temperature in the bulk reactor zone.

As mentioned, the fluidized bed reactors of the present disclosure may (and preferably do) comprise one or more downcomers that fluidly connect the bulk reactor zone located at or near the top of the reactor to the mixing zone located at or near the bottom part of the reactor, so as to supply a catalyst recirculation stream from the bulk reactor zone to the mixing zone. Generally, the one or more downcomers allow for the downward flow of a catalyst recirculation stream from the bulk reactor zone to the mixing zone. In one embodiment, a downcomer may be an external pipe or alternatively, a downcomer may be present internally in the core of the fluidized bed reactor.

Fluidization in the mixing zone and bulk reactor zone of the fluidized bed reactor may be performed with a fluidizing gas having a superficial velocity effective for carrying out the type of fluidization desired (e.g., bubbling bed fluidization), considering the properties of the biomass feedstock, conditions within the reactor, and the particular fluidizing gas being used. In general, a fluidizing gas comprising hydrogen will have a superficial velocity of generally greater than about 0.1 meters per second (m/s) (e.g., from about 0.1 m/s to about 20 m/s), greater than 0.2 m/s (e.g. from about 0.2 m/s to about 1.5 m/s), typically greater than about 0.3 m/s (e.g., from about 0.3 m/s to about 1.2 m/s), and often greater than about 0.5 m/s (e.g., from about 0.5 m/s to about 1 m/s). Suitable fluidizing gas streams comprise primarily hydrogen, but may also contain other non-condensable gases (e.g. CO, $CO_2$, and/or $CH_4$).

Preferably, the superficial gas velocity of the fluidizing gas in the mixing zone is the same as or higher than that in the bulk reactor zone. Generally speaking, a higher superficial gas velocity in the mixing zone enables the use of larger biomass particles as compared to a standard fluidized bed as they do not sink to the bottom and form deposits. It is within the ability of one skilled in the art to select a suitable combination of superficial gas velocity, length of mixing zone and diameter of mixing zone, taking into consideration, for example, the rate at which the biomass feedstock is fed into the mixing zone, the amount of catalyst circulated and partial pressure of hydrogen within the reactor, the desired residence time of the biomass, catalyst, and fluidizing gas, etc. It is also within the ability of one skilled in the art to determine a suitable combination of superficial gas velocity, length of mixing zone and diameter of mixing zone such that back-mixing of biomass from a bulk reactor zone located above the mixing zone is negligible, taking into consideration, for example, the dimensions of the mixing zone and the bulk reactor zone.

In step b) of the method according to the present invention, the biomass feedstock in the bulk reactor zone of the fluidized bed reactor is subjected to a hydropyrolysis reaction by contacting the biomass feedstock with the deoxygenating catalyst in the presence of the fluidizing gas, thereby obtaining a hydropyrolysis reactor output comprising at least one non-condensable gas, a partially deoxygenated hydropyrolysis product and char.

The term 'hydropyrolysis' is used generally to refer to a process by which a biomass feedstock is rapidly heated and thermally decomposed, in the presence of solid catalyst particles in an atmosphere consisting largely of hydrogen gas. The hydropyrolysis process provides a means to remove oxygen from biomass and other feedstocks containing significant quantities of carbon and chemically-bonded oxygen to produce light hydrocarbons products with a large portion of the oxygen removed from the feedstock-derived liquid. A representative hydropyrolysis process has been described in detail in, among others, U.S. Pat. Nos. 8,492,600 and 8,841,495, the relevant disclosure of which is hereby incorporated by reference.

The conditions in the bulk reactor zone of the fluidized bed reactor are not particularly limited provided that the hydropyrolysis reaction can take place.

According to the present invention, the bulk reactor zone is cooled by means of a cooling fluid flowing through a plurality of tubes running through the bulk reactor zone, the plurality of tubes having inlets into and outlets from the bulk reactor zone. Further, according to the present invention, the cooling fluid flowing in the tubes at the point where the biomass feedstock enters the bulk reactor zone (usually from the mixing zone) has a temperature of at least 320° C., preferably at least 340° C., more preferably at least 350° C., even more preferably at least 370° C., yet even more preferably at least 380° C. It has been surprisingly found according to the present invention that by using a plurality of tubes (with cooling fluid flowing therethrough) and by using a relatively high temperature for the cooling fluid, the deposition of sticky materials such as tar can be minimized or even avoided. This, whilst the deoxygenation reaction is completed by more than 75%, and whilst the cooling fluid flowing in the tubes at the point where the biomass feedstock enters the bulk reactor zone has a temperature of at least 320° C. and preferably at most 480° C.

The person skilled in the art will readily understand that the plurality of tubes running through the bulk reactor zone (and through which the cooling fluid flows) can be varied in many ways. Preferably, the plurality of tubes run substantially parallel through the bulk reactor zone. Also, it is preferred that the plurality of tubes run substantially vertically through the bulk reactor zone (such that the cooling flow flows upwards or downwards). The plurality of tubes may be U-shaped such that both the inlet into and the outlet from the bulk reactor zone are at the same level, e.g. at the top (or at the bottom), of the bulk reactor zone.

The plurality of tubes may or may not extend to (and hence pass through) at least a part of the mixing zone of the fluidized bed reactor.

Preferably, the biomass feedstock contacts the deoxygenating catalyst in the bulk reactor zone at an operation temperature in the range of from 320° C. to 500° C., more preferably in the range of from 350° C. to 480° C. even more preferably from 370° C. to 450° C.

The exact operating temperature depends upon the composition of the feedstock that is to undergo hydropyrolysis, the characteristics of the deoxygenating catalyst, and the desired composition of products that is to be obtained.

According to a preferred embodiment of the method according to the present invention, the cooling fluid flowing in the tubes at the point where the biomass feedstock enters the bulk reactor zone has a temperature that is at least 20° C.

lower than the operation temperature in the bulk reactor zone, preferably at least 30° C. lower, more preferably at least 40° C. lower.

In case the plurality of tubes extend to (and hence pass through) at least a part of the mixing zone, then the cooling fluid flowing through the tubes in the mixing zone preferably has a temperature that is at most 20° C. lower than the operation temperature in the mixing zone, preferably at most 10° C. lower, more preferably at most 5° C. lower than the operation temperature in the mixing zone. By keeping the temperature of the cooling fluid running through the tubes in the mixing zone close to and preferably at least at the operation temperature in the mixing zone, the temperature of the mixing zone can be closely tailored.

Of course, to have a cooling effect in the bulk reactor zone, the cooling fluid running through the tubes in the bulk reactor zone has a temperature that is lower than the highest temperature in the bulk reactor zone. Preferably, the cooling fluid flowing in the tubes at the point where the biomass feedstock enters the bulk reactor zone has a temperature that is lower than the temperature of the hydropyrolysis reactor output when it leaves the bulk reactor zone ('outlet temperature'). Preferably, the cooling fluid flowing in the tubes at the point where the biomass feedstock enters the bulk reactor zone has a temperature of at most 480° C., preferably at most 440° C., even more preferably at most 400° C., yet even more preferably at most 380° C.

According to an especially preferred embodiment of the method according to the present invention, the cooling fluid comprises a molten salt, preferably a molten metal nitrate. The benefit of using molten salts as the cooling fluids is that they have generally a high thermal conductivity, a long operating life, a long-term chemical stability and a boiling point that is safely above the maximum operating temperature of the fluidized bed.

Although the molten salt is not particularly limited, it should have a melting point below the operating temperatures of the bulk reactor zone. Typically, the molten salts may be alkali halides or earth alkali halides or nitrates. Suitable examples of molten salts are salts selected from lithium fluoride, sodium fluoride, potassium fluoride, beryllium fluoride, rubidium fluoride, boron fluoride, zirconium fluoride, potassium chloride, sodium chloride, potassium nitrate, sodium nitrate, lithium nitrate, potassium carbonate, sodium carbonate, lithium carbonate, or mixtures thereof. The molten salt/metal is present in the reaction zone at a temperature above its melting point.

The pressure within the bulk reactor zone is not particularly limited. Preferably, the biomass feedstock contacts the deoxygenating catalyst in the bulk reactor zone at a pressure in the range of from 0.50 MPa to 7.50 MPa.

The exact operating pressure of the fluidized bed reactor depends upon the composition of the feedstock that is to undergo hydropyrolysis, the choice of catalyst, the composition of the fluidizing gas (i.e. the hydrogen rich gas purity) and the desired composition of products that are to be obtained.

The temperature of the fluidizing gas is typically in the range of 100 to 800° C., preferably from 200 to 600° C., and more preferably from 300 to 500° C.

Optionally, a fluidized bed reactor of the present disclosure may further comprise an expanded solids disengagement zone (i.e., a section of expanded reactor diameter or cross-sectional area, relative to the diameter or cross-sectional area of the bulk reactor zone) at a suitable height above the bulk reactor zone in order to promote the separation of solid char particles from solid catalyst particles.

The expanded disengagement zone may have a reduced superficial gas velocity to promote the effective disengagement of relatively small diameter catalyst particles that would otherwise be elutriated at the higher superficial gas velocity through the bulk reactor zone. Other gas-solids separation devices (e.g. filters, cyclones, etc.) may be employed in place of, but preferably in combination with, the use of an expanded solids disengagement zone.

Preferably, the method according to the present invention further comprises before step a) the steps of:
  i) supplying the biomass feedstock, the fluidizing gas and a catalyst recirculation stream comprising deoxygenating catalyst to a mixing zone of the fluidized bed reactor;
  ii) allowing the biomass feedstock, the fluidizing gas and the deoxygenating catalyst to move upwards through the fluidized bed reactor from the mixing zone to the bulk reactor zone; and
  iii) withdrawing at least a portion of the deoxygenating catalyst from the bulk reactor zone to form the catalyst recirculation stream that is supplied to the mixing zone in step i).

More specifically, the fluidized bed reactors of the present disclosure use one or more downcomers to supply a hot catalyst recirculation stream from a bulk reactor zone located at or near the top of the reactor to a mixing zone located at or near the bottom of the reactor. In this manner, it is possible to withdraw hot catalyst from a bulk reactor zone located at or near the top of the reactor and transfer it to a mixing zone located at or near the bottom of the reactor, thereby enabling more efficient axial heat transfer throughout the reactor, and consequently being able to stay within the temperature bounds that are intrinsic to the process chemistry. Furthermore, by introducing a catalyst recirculation stream and a biomass feedstock to a mixing zone at or near the bottom of the reactor, the biomass feedstock is able to be rapidly heated as the hot catalyst recirculation stream is brought into contact with the biomass, and more adequately dispersed in the deoxygenating catalyst, thereby facilitating the hydropyrolysis process.

The hydropyrolysis method of the present disclosure produce a hydropyrolysis reactor output comprising a partially deoxygenated hydropyrolysis product (e.g. in the form of a condensable vapor), at least one non-condensable gas (e.g., CO, $CO_2$, and/or $CH_4$), and char particles. As used herein, the 'partially deoxygenated hydropyrolysis product' may comprise oxygenated hydrocarbons (e.g., derived from cellulose, hemicellulose, and/or lignin) that may be subjected to more complete deoxygenation (e.g., to produce hydrocarbons and remove the oxygen in the form of $CO_2$, and/or water) in a subsequent (downstream) hydroconversion process. Representative oxygen contents of the partially deoxygenated hydropyrolysis product are generally in the range from about 1 to about 30% by weight, or from about 5 to about 25% by weight.

According to a preferred embodiment of the method according to the present invention that it further comprises the steps of:
  c) removing substantially all char from the hydropyrolysis reactor output to provide a purified hydropyrolysis reactor vapor stream;
  d) hydroconverting at least a portion of the purified hydropyrolysis reactor vapor stream in at least one hydroconversion reactor comprising a hydroconversion catalyst to produce a hydroconversion reactor output; and e) recovering a substantially fully deoxygenated hydrocarbon liquid and a gaseous mixture from the hydroconversion reactor output.

Char Removal

More specifically, following hydropyrolysis, representative processes may further comprise removing all or substantially all of the char particles and/or other solid particles (e.g., catalyst fines) from the hydropyrolysis reactor output to provide a purified hydropyrolysis reactor vapor stream having a reduced char content. The removal of char particles may be particularly important in processes in which the products of hydropyrolysis, including the purified hydropyrolysis product vapor stream or a portion thereof, are subjected to a fixed bed catalytic conversion process. In such cases, the removal of fine char particles prevents problems associated with premature plugging of the fixed bed as the char particles become trapped within the voids of the fixed catalyst bed. As defined herein, the removal of substantially all of the char particles means that at least 99% by weight of the char particles in the hydropyrolysis reactor output are excluded from the purified hydropyrolysis product vapor stream. According to further embodiments, at 99.9% by weight, or at least 99.99% by weight, of the char particles are excluded.

The method of char and catalyst fines removal is generally not limited and may include any method suitable for use with the hydropyrolysis processes of the present disclosure. A suitable method of char and catalyst fines removal from the vapor stream is by cyclone separation. Other examples of suitable char removal include those described in U.S. Pat. No. 10,822,546, the relevant disclosure of which is hereby incorporated by reference.

Hydroconversion Reactor

In further embodiments, processes of the present disclosure may optionally further comprise hydroconverting at least a portion of the partially deoxygenated hydropyrolysis product or purified hydropyrolysis reactor vapor stream in a hydroconversion reactor vessel comprising a hydroconversion catalyst (e.g., as a fixed bed). A hydroconversion reactor output is produced, from which a substantially fully deoxygenated hydrocarbon liquid and a gaseous mixture may be recovered. Suitable hydroconversion catalyst compositions comprise catalysts suitable for hydrodeoxygenation and aromatic saturation. This step may suitably be carried out at a temperature in the range of from 150° C. to 400° C. and a pressure in the range of from 0.50 MPa to 7.50 MPa. The weight hourly space velocity (WHSV) for this step is in the range of about 0.1 h$^{-1}$ to about 2 h$^{-1}$.

Conditions in the hydroconversion reactor include a temperature generally from 200° C. to 475° C., typically from 260° C. to 450° C., and often from 315° C. to 430° C. The weight hourly space velocity (WHSV) of the hydroconversion reactor, calculated as the total weight flow rate of the feed, to the hydroconversion reactor (e.g., a purified vapor stream obtained from the hydropyrolysis reactor, following the removal of char particles) divided by the weight of the catalyst inventory of the hydroconversion reactor, is generally from 0.01 hr$^{-1}$ to 5 hr$^{-1}$, typically from 0.05 hr$^{-1}$ to 5 hr$^{-1}$, and often from 0.1 hr$^{-1}$ to 4 hr$^{-1}$.

In a further aspect, the present invention provides a fluidized bed reactor suitable for performing the method for subjecting a biomass feedstock to hydropyrolysis according to the present invention, the reactor at least comprising:

a bulk reactor zone containing a deoxygenating catalyst, configured to produce a hydropyrolysis reactor output comprising at least one non-condensable gas, a partially deoxygenated hydropyrolysis product and char; and a plurality of tubes running through the bulk reactor zone, the plurality of tubes having inlets into and outlets from the bulk reactor zone, wherein the bulk reactor zone can be cooled by means of a cooling fluid flowing through the tubes; and wherein the reactor is configured such that the cooling fluid flowing in the tubes at the point where the biomass feedstock enters the bulk reactor zone has a temperature of at least 320° C., preferably at least 340° C., more preferably at least 350° C., even more preferably at least 370° C., yet even more preferably at least 380° C.

As discussed above, it is preferred that the cooling fluid comprises a molten salt, preferably molten metal nitrates.

According to a preferred embodiment of the fluidized bed reactor according to the present invention, the reactor further comprises a mixing zone, one or more downcomers fluidly connecting the mixing zone and the bulk reactor zone, and an outlet at the top of the fluidized bed reactor configured to produce the hydropyrolysis reactor output;

wherein the mixing zone comprises: one or more inlets that are fluidly connected to a source of a biomass feedstock; one or more inlets that are fluidly connected to a source of a fluidizing gas; and one or more inlets for one or more outlets of the one or more downcomers fluidly connecting the mixing zone and the bulk reactor zone; and wherein the bulk reactor zone is positioned above the mixing zone.

Hereinafter the present invention will be further illustrated by the following non-limiting drawings. Herein shows:

FIG. 1 schematically a first embodiment of a reactor suitable for performing the method according to the present invention;

FIG. 2 schematically a top down view of the mixing zone shown in FIG. 1;

FIG. 3 schematically a second embodiment of a reactor suitable for performing the method according to the present invention; and FIG. 4 schematically a top down view of the mixing zone shown in FIG. 3.

For the purpose of this description, same reference numbers refer to same or similar components.

The fluidized bed reactor of FIG. 1, generally referred to with reference number 100, comprises mixing zone 110, bulk reactor zone 150 and expanded solids disengagement zone 160. Mixing zone 110 comprises one cylindrical vessel 105. Biomass feedstock 120 is supplied to cylindrical vessel 105 in mixing zone 110 of reactor 100 via one or more inlets.

Although not depicted in FIG. 1, biomass feedstock 120 may be supplied to cylindrical vessel 105 via more than one inlet location, which can be at different axial heights. Fluidizing gas stream 130 is supplied to fluidized bed reactor 100 via one or more inlets at or near the bottom of reactor 100 and may serve to entrain any solid particles present in biomass feedstock 120. In the embodiment of FIG. 1 a catalyst recirculation stream 140 is withdrawn from reactor 100 via one or more outlets in bulk reactor zone 150 and supplied to mixing zone 110 of hydropyrolysis reactor 100 via one or more inlets. In mixing zone 110, biomass feedstock, fluidizing gas and deoxygenating catalyst, which in the embodiment of FIG. 1 is at least partially supplied from catalyst recirculation stream 140, are mixed and subsequently supplied to bulk reactor zone 150.

In bulk reactor zone 150, the biomass feedstock undergoes hydropyrolysis in the presence of the deoxygenating catalyst so as to produce a hydropyrolysis reactor output comprising at least one non-condensable gas, a partially deoxygenated hydropyrolysis product and char, which is removed as hydropyrolysis reactor output stream 170 via one or more outlets.

Bulk reactor zone 150 comprises a plurality of parallel, vertical extending tubes 155 running through the disengagement zone 160 and the bulk reactor zone 150 (and part of the mixing zone 110). The plurality of tubes 155 have inlets 156 into and outlets 157 from the bulk reactor zone 150. In the embodiment of FIG. 1 the plurality of tubes have a U-shape, as a result of which the inlets 156 into and outlets 157 from the bulk reaction zone 150 are at the top of the bulk reaction zone 150. The bulk reactor zone 150 can be cooled by means of a cooling fluid flowing through the tubes 155. Preferably, the cooling fluid is a molten salt.

During use, the cooling fluid flowing in the tubes 155 at the point A where the biomass feedstock enters the bulk reactor zone 150 from the mixing zone 110 has a temperature of at least 320° C.

FIG. 2 shows a top down view of the mixing zone 105 in FIG. 1.

FIG. 3 and FIG. 4 schematically show an alternative embodiment of a reactor suitable for performing the method according to the present invention. As can be seen more clearly from the top down view of FIG. 4, this alternative embodiment comprises four separate mixing zones.

Discussion

As can be seen from the above Example, the method and fluidized bed reactor according to the present invention allows for an effective way of subjecting a biomass feedstock to hydropyrolysis, whilst avoiding the deposition of sticky materials such as tar.

The person skilled in the art will readily understand that many modifications may be made without departing from the scope of the invention.

The invention claimed is:

1. A method of subjecting a biomass feedstock to hydropyrolysis, the method at least comprising the steps of:
   a) supplying a biomass feedstock and a fluidizing gas comprising hydrogen to a bulk reactor zone of a fluidized bed reactor containing a deoxygenating catalyst;
   b) subjecting the biomass feedstock in the bulk reactor zone of the fluidized bed reactor to a hydropyrolysis reaction by contacting the biomass feedstock with the deoxygenating catalyst in the presence of the fluidizing gas, thereby obtaining a hydropyrolysis reactor output comprising at least one non-condensable gas, a partially deoxygenated hydropyrolysis product and char;
   wherein the fluidized bed reactor further comprises a plurality of tubes running through the bulk reactor zone and at least a portion of a mixing zone of the bulk reactor located below the bulk reactor zone, and wherein cooling fluid flowing in the tubes at a point where the biomass feedstock enters the bulk reactor zone has a temperature of at least 320° C.

2. The method according to claim 1, wherein the biomass feedstock contacts the deoxygenating catalyst in the bulk reactor zone at an operation temperature in the range of from 320° C. to 500° C.

3. The method according to claim 2, wherein the cooling fluid flowing in the tubes at the point where the biomass feedstock enters the bulk reactor zone has a temperature that is at least 20° C. lower than the operation temperature in the bulk reactor zone.

4. The method according to claim 1, wherein the cooling fluid flowing in the tubes at the point where the biomass feedstock enters the bulk reactor zone has a temperature that is lower than the temperature of the hydropyrolysis reactor output when it leaves the bulk reactor zone.

5. The method according to claim 1, wherein the cooling fluid flowing in the tubes at the point where the biomass feedstock enters the bulk reactor zone has a temperature of at most 480° C.

6. The method according to claim 1, wherein the cooling fluid comprises a molten salt.

7. The method according to claim 1, wherein the biomass feedstock contacts the deoxygenating catalyst in the bulk reactor zone at a pressure in the range of from 0.50 MPa to 7.50 MPa.

8. The method according to claim 1, wherein the method further comprises before step a) the steps of:
   i) supplying the biomass feedstock, the fluidizing gas and a catalyst recirculation stream comprising deoxygenating catalyst to the mixing zone of the fluidized bed reactor;
   ii) allowing the biomass feedstock, the fluidizing gas and the deoxygenating catalyst to move upwards through the fluidized bed reactor from the mixing zone to the bulk reactor zone; and
   iii) withdrawing at least a portion of the deoxygenating catalyst from the bulk reactor zone to form the catalyst recirculation stream that is supplied to the mixing zone in step i).

9. The method of claim 8, wherein step a) comprises feeding the biomass feedstock into the mixing zone through an inlet that is located above an inlet for the fluidizing gas.

10. The method according to claim 1, wherein the method further comprises the steps of:
   c) removing substantially all char from the hydropyrolysis reactor output to provide a purified hydropyrolysis reactor vapor stream;
   d) hydroconverting at least a portion of the purified hydropyrolysis reactor vapor stream in a hydroconversion reactor comprising a hydroconversion catalyst to produce a hydroconversion reactor output; and
   e) recovering a substantially fully deoxygenated hydrocarbon liquid and a gaseous mixture from the hydroconversion reactor output.

11. The method of claim 1, wherein the cooling fluid flowing in the tubes at the point where the biomass feedstock enters the bulk reactor zone has a temperature that is less than an outlet temperature of the bulk reactor zone.

12. The method of claim 1, comprising mixing the biomass feedstock with the fluidizing gas in the mixing zone before supplying the biomass feedstock and the fluidizing gas to the bulk reaction zone.

13. The method of claim 1, wherein the mixing zone makes up 4% to 30% of a total reactor volume.

* * * * *